United States Patent
Chen (10) Patent No.: US 7,408,981 B2
(45) Date of Patent: Aug. 5, 2008

(54) METHODS AND CIRCUITS FOR PERFORMING MARGINING TESTS IN THE PRESENCE OF A DECISION FEEDBACK EQUALIZER

(75) Inventor: Fred F. Chen, San Francisco, CA (US)

(73) Assignee: Rambus Inc., Los Altos, CA (US)

( * ) Notice: Subject to any disclaimer, the term of this patent is extended or adjusted under 35 U.S.C. 154(b) by 742 days.

(21) Appl. No.: 10/441,461

(22) Filed: May 20, 2003

(65) Prior Publication Data

US 2004/0234014 A1 Nov. 25, 2004

(51) Int. Cl.
*H03H 7/30* (2006.01)
*H04L 27/00* (2006.01)

(52) U.S. Cl. ........................ 375/229; 375/316

(58) Field of Classification Search ......... 375/229–236, 375/316, 353; 327/50–98
See application file for complete search history.

(56) References Cited

U.S. PATENT DOCUMENTS

| | | | |
|---|---|---|---|
| 4,449,102 A | | 5/1984 | Frazer |
| 4,695,969 A | * | 9/1987 | Sollenberger ............... 708/323 |
| 5,325,397 A | | 6/1994 | Scholz et al. |
| 5,331,663 A | | 7/1994 | Kurokami ..................... 375/14 |
| 5,459,762 A | * | 10/1995 | Wang et al. ................. 375/336 |
| 5,475,710 A | * | 12/1995 | Ishizu et al. ................ 375/232 |
| 5,949,819 A | * | 9/1999 | Bjarnason et al. ........... 375/222 |
| 5,966,262 A | * | 10/1999 | Brickner et al. ............. 360/65 |
| 6,256,342 B1 | * | 7/2001 | Schlag et al. ............... 375/229 |
| 6,493,394 B2 | | 12/2002 | Tamura et al. .............. 375/257 |
| 6,907,065 B2 | * | 6/2005 | Kim .............................. 375/233 |
| 7,184,477 B2 | * | 2/2007 | Haunstein et al. ........... 375/233 |
| 2002/0060820 A1 | * | 5/2002 | Buchali ....................... 359/109 |
| 2003/0223489 A1 | * | 12/2003 | Smee et al. ................. 375/233 |

FOREIGN PATENT DOCUMENTS

DE 199 14 793 A1 10/2000

(Continued)

OTHER PUBLICATIONS

Rajarshi Gupta, Kiran, Edward A. Lee, "Computationally Efficient Version of the Decision Feedback Equalizer." Sep. 1998. 4 Pages.

(Continued)

*Primary Examiner*—Chieh M. Fan
*Assistant Examiner*—Jason M. Perilla
(74) *Attorney, Agent, or Firm*—Silicon Edge Law Group LLP; Arthur J. Behiel (57) ABSTRACT

Described are methods and circuits for margin testing receivers equipped with Decision Feedback Equalization (DFE) or other forms of feedback that employ historical data to reduce intersymbol interference (ISI). In one example, a high-speed serial receiver with DFE injects the correct received data (i.e., the "expected data") into the feedback path irrespective of whether the receiver produces the correct output data. The margins are therefore maintained in the presence of receiver errors, allowing in-system margin tests to probe the margin boundaries without collapsing the margin limits. Some receivers include local expected-data sources that either store or generate expected data for margin tests. Other embodiments derive the expected data from test data applied to the receiver input terminals.

22 Claims, 4 Drawing Sheets

FOREIGN PATENT DOCUMENTS

| | | |
|---|---|---|
| DE | 102 41 848 A1 | 3/2004 |
| EP | 1 143 654 A2 | 10/2001 |
| EP | 1 315 327 A2 | 5/2003 |

OTHER PUBLICATIONS

Christoph M. Degen, Christoph M. Walke, and Bernhard Rembold. "Comparative Study of Efficient Decision-Feedback Equalization Schemes for MIMO Systems." Presented on Feb. 2002. 7 Pages. Institute of High Frequency Technology, RWTH Aachen, Germany.

John Koeter. "What's an LFSR?" Texas Instruments, SCTA036A. Dec. 1996. 2 cover pages, pp. iiii-iv, pp. 1-7.

Heider N. Ereifej, Ronald Holzlohner, Gary M. Carter, and Curtis R. Menyuk. "Intersymbol Interference and Timing Jitter Measurements in a 40-Gb/s Long-Haul Dispersion-Managed Soliton System." IEEE Photonics Technology Letters, vol. 14, No. 3, Mar. 2002. pp. 343-345.

Malik D. Augeh, Joseph M. Kanh and John R. Barry. "Decision-Feedback Equalization of Pulse-Position Modulation on Measured Nondirected Indoor Infrared Channels." IEEE Transactions on Communications, vol. 47, No. 4, Apr. 1999. pp. 500-503.

Peter Alfke. "Efficient Shift Registers, LFSR Counters, and Long Pseudo-Random Sequence Generators." Xilinx Application Note, XAPP 052, (version 1.1), Jul. 7, 1996. 6 pages.

Granberg, Tom, "Handbook of Digital Techniques for High-Speed Design." Prentice Hall Modern Semiconductor Design Series. Copyright 2004 by Pearson Education, Inc. 12 pgs.

* cited by examiner

METHODS AND CIRCUITS FOR PERFORMING MARGINING TESTS IN THE PRESENCE OF A DECISION FEEDBACK EQUALIZER

BACKGROUND

Signal distortion limits the sensitivity and bandwidth of any communication system. A form of distortion commonly referred to as "intersymbol interference" (ISI) is particularly problematic and is manifested in the temporal spreading and consequent overlapping of individual pulses, or "symbols." Severe ISI prevents receivers from distinguishing symbols and consequently disrupts the integrity of received signals.

Figure 1:
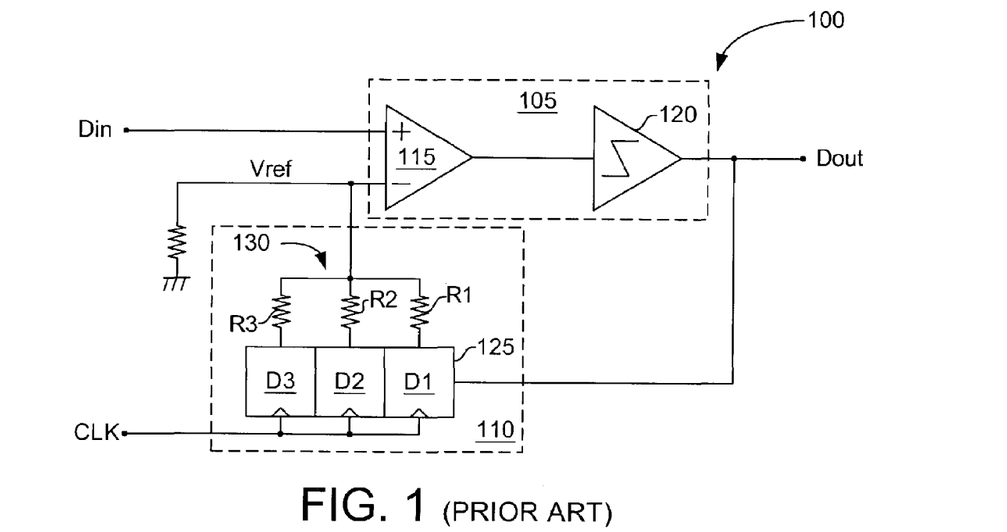
FIG. 1 (prior art) depicts a conventional digital receiver 100.

FIG. 1 (prior art) depicts a conventional receiver 100, which is used here to illustrate the ISI problem and a corresponding solution. Receiver 100 includes a data sampler 105 and a feedback circuit 110. Sampler 105 includes a differential amplifier 115 connected to a decision circuit 120. Decision circuit 120 periodically determines the probable value of signal Din and, based on this determination, produces a corresponding output signal Dout.

Sampler 105 determines the probable value of signal Din by comparing the input signal Din to a voltage reference Vref at a precise instant. Unfortunately, ISI depends partly on the received data pattern, so the voltage level used to express a given logic level varies with historical data patterns. For example, a series of logic zero signals followed by a logic one signal produces different ISI than a series of alternating ones and zeroes. Feedback circuit 110 addresses this problem using a technique known as Decision Feedback Equalization (DFE), which produces a corrective feedback signal that is a function of historical data patterns.

DFE feedback circuit 110 includes a shift register 125 connected to the inverting input of amplifier 115 via a resistor ladder circuit 130. In operation, receiver 100 receives a series of data symbols on an input terminal Din, the non-inverting input terminal of amplifier 115. The resulting output data Dout from sampler 105 is fed back to shift register 125, which stores the prior three output data bits. (As with other designations herein, Din and Dout refer to both signals and their corresponding nodes; whether a given designation refers to a signal or a node will be clear from the context.)

Shift register 125 includes a number of delay elements, three flip-flops D1-D3 in this example, that apply historical data bits to the reference voltage side of the differential amplifier 115 via respective resistors R1, R2, and R3. The value of each resistor is selected to provide appropriate weight for the expected effect of the corresponding historical bit. In this example, the value of resistor R3 is high relative to the value of resistor R1 because the effect of the older data (D3) is assumed to be smaller than the effect of the newer data (D1). For the same reason, the resistance of resistor R2 is between the resistors R1 and R3. Receiver 100 includes a relatively simple DFE circuit for ease of illustration: practical DFE circuits may sample more or fewer historical data values. For a more detailed discussion of a number of receivers and DFE circuits, see U.S. Pat. No. 6,493,394 to Tamura et al., issued Dec. 10, 2002, which is incorporated herein by reference.

The importance of accurate data reception motivates receiver manufacturers to characterize carefully their system's ability to tolerate ISI and other types of noise. One such test, a so-called "margin" test, explores the range of voltage and timing values for which a given receiver will properly recover input data.

Figure 2:
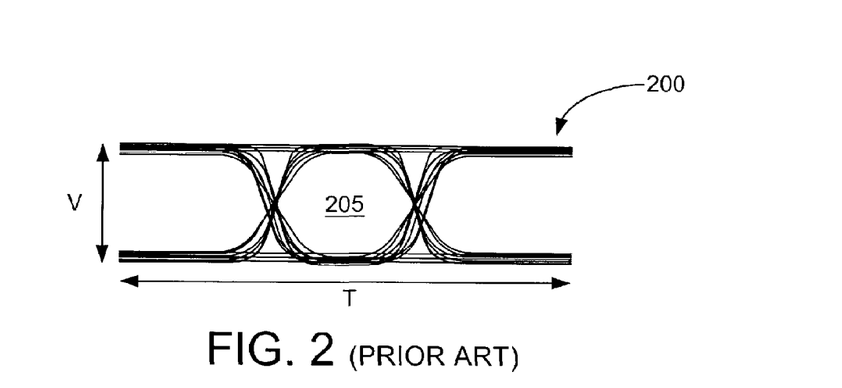
FIG. 2 depicts a fictional eye pattern 200 representing differential input data to a conventional receiver.

FIG. 2 depicts a fictional eye pattern 200 representing differential input data to a conventional receiver. Eye pattern 200 is graphed in two dimensions, voltage V and time T. The area of eye 205 represents a range of reference voltages and timing parameters within which the data represented by eye 205 will be captured. The degree to which the voltage V and time T can vary without introducing an error is termed the "margin."

Figure 3A:
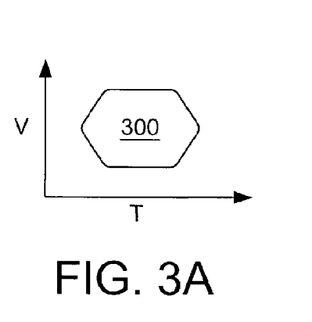
FIGS. 3A through 3C depict three signal eyes 300, 305, and 310 illustrating the effects of DFE on margins and margin testing.
Figure 3B:
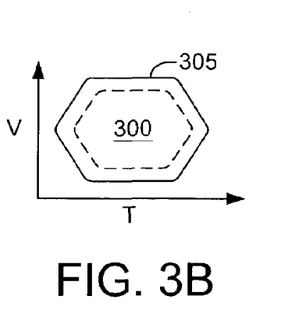
Figure 3C:
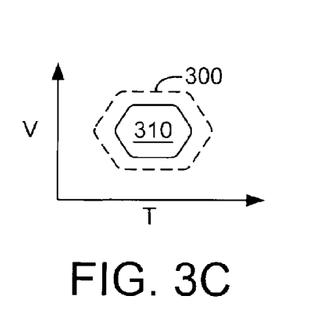

FIGS. 3A through 3C depict three signal eyes 300, 305, and 310 illustrating the effects of DFE on margins and margin testing. Referring first to FIG. 3A, eye 300 approximates the shape of eye 205 of FIG. 2 and represents the margin of an illustrative receiver in the absence of DFE. FIG. 3B represents the expanded margin of the same illustrative receiver adapted to include DFE: the DFE reduces the receiver's ISI, and so extends the margins beyond the boundaries of eye 300. Increasing the margins advantageously reduces noise sensitivity and improves bit error rates (BER).

In-system margin tests for a receiver are performed by monitoring receiver output data (e.g., Dout in FIG. 1) while varying the reference voltage and sample timing applied to the input waveform Din. With reference to FIG. 2, such testing samples various combinations of voltage and time to probe the boundaries of eye 205, the boundaries being indicated when the output data does not match the input data. Margin tests thus require the receipt of erroneous data to identify signal margins. Zerbe et al. detail a number of margin tests in "Method and Apparatus for Evaluating and Calibrating a Signaling System,"U.S. Pat. No. 6,873,939, which is incorporated herein by reference.

A difficulty arises when determining the margins of DFE-equipped receivers. While feeding back prior data bits increases the margin (FIG. 3B), the effect is just the opposite if the feedback data is erroneous. Erroneous feedback emphasizes the ISI and consequently reduces the margin, as shown in FIG. 3C. The margin of a DFE-equipped receiver thus collapses when a margin test begins to probe the limits of the test signal (e.g., the boundaries of eye 205).

The incompatible requirements of erroneous data for the margin test and correct data for the DFE thus impede margin testing. There is therefore a need for improved means of margin testing DFE-equipped receivers.

SUMMARY

The present invention is directed to methods and circuits for margin testing receivers equipped with Decision Feedback Equalization (DFE) or other forms of feedback that employ historical data to reduce inter-symbol interference (ISI). In accordance with one embodiment, a known input data stream is transmitted to a high-speed serial receiver with DFE. The receiver injects a copy of the known input data stream (i.e., the "expected data") into the feedback path irrespective of whether the receiver correctly interprets the input data. The margins are therefore maintained in the presence of receiver errors, allowing in-system margin tests to probe the margin boundaries without collapsing the margin. Receivers in accordance with some embodiments include local sources of expected data; other embodiments derive the expected data from test data applied to the receiver.

This summary does not limit the invention, which is instead defined by the allowed claims.

DETAILED DESCRIPTION

Figure 4:
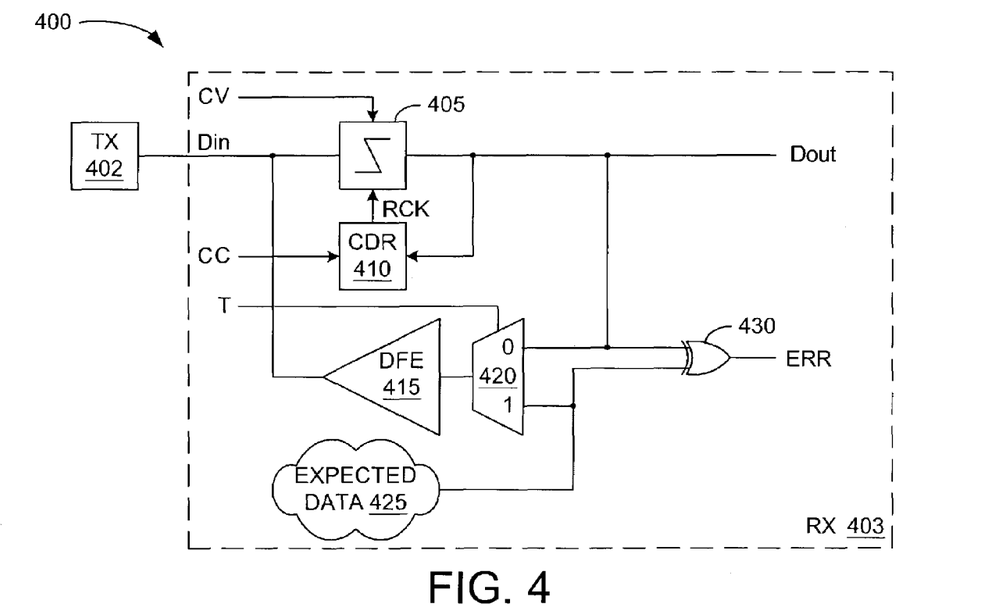
FIG. 4 depicts a communication system 400, including a conventional transmitter 402 connected to a DFE-equipped receiver 403 adapted in accordance with one embodiment.

FIG. 4 depicts a communication system 400, including a conventional transmitter 402 connected to a receiver 403 equipped with Decision Feedback Equalization (DFE). In a normal operational mode, receiver 403 samples an input data stream from transmitter 402. The sampled data provides DFE feedback to reduce intersymbol interference (ISI). In a margin-test mode, receiver 403 samples a known input data stream using ranges of sample timing and reference voltages. To prevent a collapse of the margins, the DFE feedback path disregards the potentially erroneous sampled data in favor of an identical version of the known input data stream. In-system margin tests can therefore probe the margin without collapsing the margin limits.

Receiver 403 conventionally includes a sampler 405, an optional clock-data recovery (CDR) circuit 410, and a DFE circuit 415. During normal operation, receiver 403 receives a data stream (e.g., a series of data symbols) on sampler input terminal Din. Sampler 405 samples the data stream using a recovered clock RCK from CDR circuit 410 and produces the resulting sampled data stream on a sampler output terminal Dout. DFE circuit 415 stores a plurality of prior data samples and uses these to condition the input data in the manner discussed above in connection with FIG. 1. In addition to the conventional components, receiver 403 includes a multiplexer 420, an expected-data source 425, and some comparison logic 430, in this case an exclusive OR gate.

During normal operation, a test control signal T to multiplexer 420 is set to a logic zero to connect the output data Dout to the input of DFE 415. Thus configured, receiver 403 acts as a conventional DFE-equipped receiver. In a margin-test mode, however, select signal T is set to a logic one so as to convey an expected data stream from data source 425 to the input of DFE 415. Transmitter 402 then supplies known test data on terminal Din while the expected data is applied to DFE 425. The expected data is an identical, time-shifted version of the known data applied to input terminal Din, so DFE 415 produces the correct feedback without regard to the output signal Dout. In essence, multiplexer 420 provides the feedback path with a first input terminal for sampled output data in the operational mode and with a second input terminal for expected data in the margin-test mode.

The repeated reference herein to "terminal" Din, as opposed to the plural form "terminals," is for brevity. Receivers may include more than one data-input terminal, such as those that rely upon differential signaling. Likewise, other clock, reference, and signal paths noted herein can be single-ended, differential, etc., as will be evident to those of skill in the art. The preferred manner in which particular test circuits and methods are adapted for use with a given receiver will depend, in part, on the receiver architecture.

A voltage control signal CV on a like-named sampler input terminal alters the reference voltage used by sampler 405 to sample input data. A clock control signal CC to CDR circuit 410 modifies the timing of recovered clock signal RCK. Control signals CV and CC are used in margin testing to explore the voltage and timing margins of receiver 403. When the margin tests reach the margin limits, and thus introduce errors in output signal Dout, expected-data source 425 continues to provide the correct DFE feedback signal and consequently prevents the margins from collapsing in response to the errors. Comparison circuit 430 monitors the sampled-data series for errors by comparing the output data with the expected data from expected-data source 425. In the event of a mismatch, comparison circuit 430 produces a logic one error signal ERR. A sequential storage element (not shown) captures any error signal. Receiver 403 thus facilitates margin testing of DFE-equipped receivers without collapsing the margin of interest. (Error signal ERR is not monitored in the operational mode.)

Expected-data source 425 produces the same data as expected on input terminal Din. Source 425 can be a register in which is previously stored a known data pattern to be provided during margin testing. Source 425 might also be a register that goes through an expected sequence of data, such as a counter or a linear-feedback shift register (LFSR). Regardless of the source, the expected data presents the expected output data, appropriately timed, to the input of the feedback circuit DFE 415.

Figure 5:
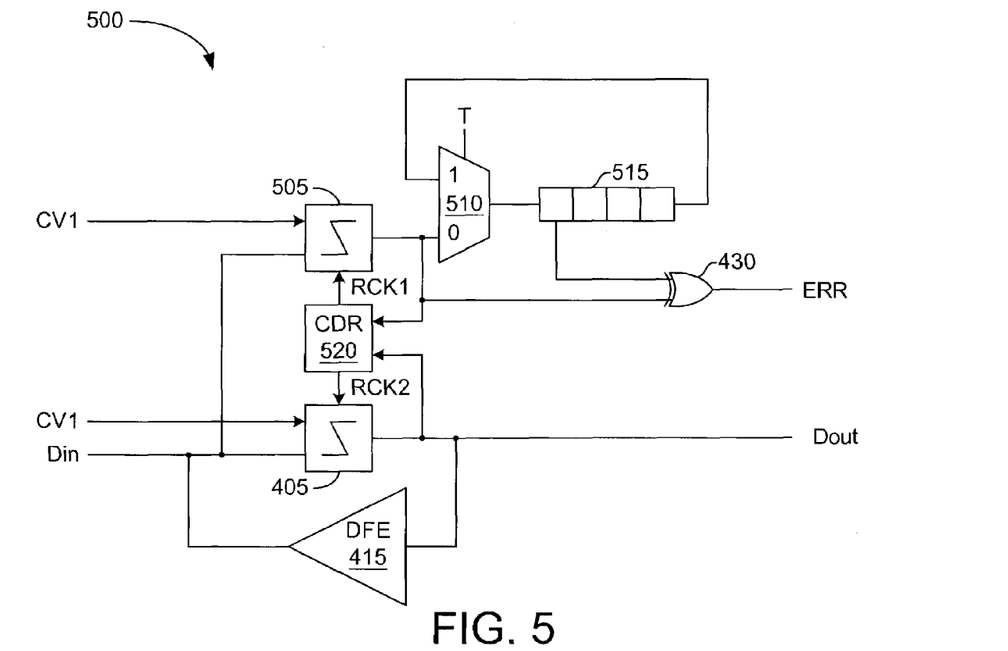
FIG. 5 depicts a DFE-equipped receiver 500 adapted in accordance with an embodiment to include improved means of margin testing.

FIG. 5 depicts a receiver circuit 500 in accordance with another embodiment. Receiver 500 is similar in some ways to receiver 403 of FIG. 4, like-numbered elements being the same. Receiver 500 is extended to include a second sampler 505 that is substantially identical to, and consequently mimics the behavior of, sampler 405. The margin tests are performed on replica sampler 505 so that margin-testing circuitry has little or no impact on the performance of receiver 500 in the operational mode.

Receiver 500 includes a multiplexer 510 connected to a shift register 515. A modified clock and data recovery circuit CDR 520 controls the timing of both samplers 505 and 405. The timing control terminal is omitted for brevity.

Prior to a margin test, test signal T is set to logic zero and the storage elements within register 515 are loaded with an expected-data sequence. Then, in the test mode, test terminal T is set to logic one so that shift register 515 feeds its output back to its input via multiplexer 510. To perform a margin test, sampler 505 samples input data Din. Comparison circuit 430 compares the resulting samples with the expected-data sequence provided by the first storage element in register 515. Any difference between the data sampled by the replica sampler 505 and the expected sequence from register 515 induces comparison circuit 430 to produce a logic one error signal on line ERR. Clocking circuitry, e.g. within CDR 520, can be adapted to control separately the recovered clock signals RCK1 and RCK2.

Figure 6:
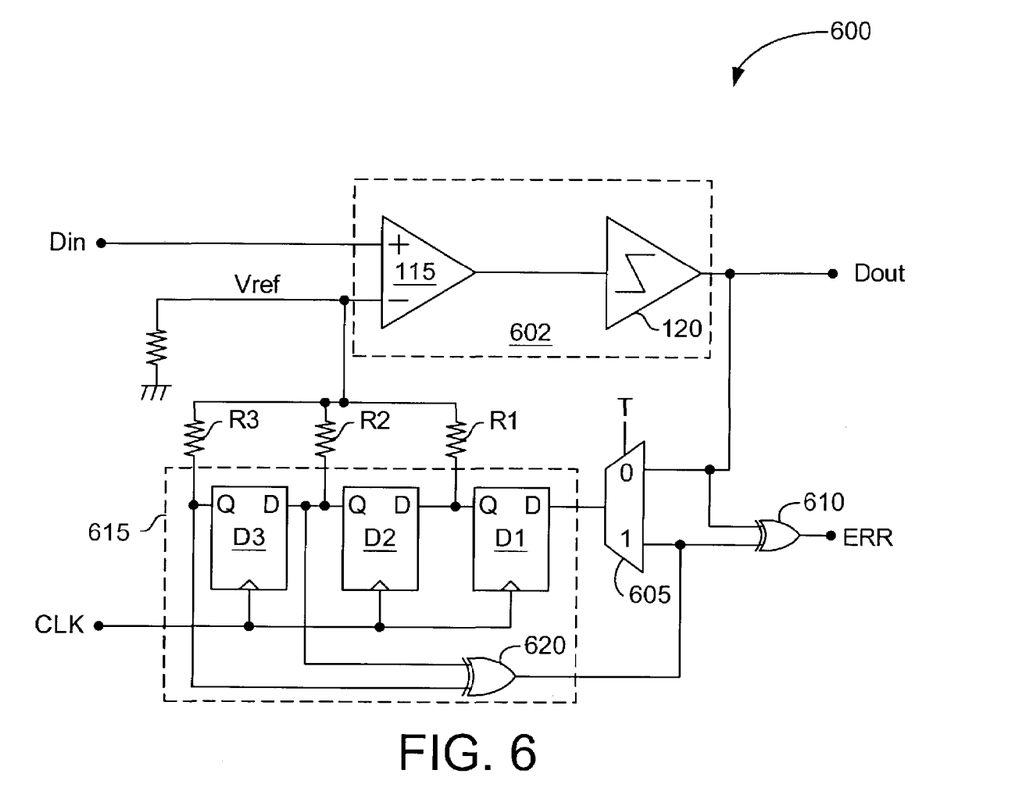
FIG. 6 depicts a receiver 600 in accordance with another embodiment.

FIG. 6 depicts a receiver 600 in accordance with another embodiment. Receiver 600 is similar to the conventional receiver 100 of FIG. 1, but is modified to support improved margin testing.

Receiver 600 includes a sampler 602 that, like sampler 105 of FIG. 1, includes a differential amplifier 115 and a decision circuit 120. Although not shown, sampler 602 includes conventional means of adjusting the reference voltage and timing to support margin testing. DFE of receiver 600 performs conventionally in the operational mode and provides expected data in the margin-test mode.

Receiver 600 includes a multiplexer 605, a comparison circuit 610, and a dual-mode register 615. Multiplexer 605 conveys output signal Dout to register 615 in the operational mode. Thus configured, receiver 600 functions analogously to receiver 100 of FIG. 1. That is, register 615 shifts in the output data Dout and employs three bits of historic data to provide ISI-minimizing feedback to sampler 602.

During margin testing, test signal T is set to logic one. In that case, multiplexer 605 provides the output of an XOR gate 620 to the input of register 615. The inclusion of XOR gate 620 and the path through multiplexer 605 converts register 615 into a linear-feedback shift register (LFSR) that provides a pseudo-random but deterministic sequence of bits to both the input of register 615 and an input of XOR gate 610. Also during the margin test, the same pseudo-random sequence produced by register 615 is provided on input terminal Din. This test sequence is applied one clock cycle ahead of the expected data from register 615, so the DFE will reflect the appropriate data regardless of whether output data Dout is correct. The timing and reference voltage of sampler 602 can therefore be adjusted while monitoring output data Dout for errors without fear of collapsing the margin limits. Comparison circuit 610, an exclusive OR gate in this example, flags any mismatches between the output data and the expected data to identify errors.

In the example of FIG. 6, the pseudo-random sequence of test bits applied to input terminal Din is assumed to come from an external source, such as a conventional tester. The disclosed embodiments can also be adapted to support built-in self test (BIST) or in-system testing. For example, a linked transmitter/receiver pair adapted in accordance with one embodiment can margin test the intervening link. In other embodiments, receiver 600 is modified so that register 615 or another on-chip source provides the input test sequence. In some embodiments, register 615 is extended to include additional storage elements to produce more complex pseudo-random bit sequences. In such cases, the number of outputs from register 615 to the input of sampler 602 can be the same as or different from the number of storage elements employed by the LFSR. For additional details regarding LFSRs, see "What's an LFSR," document no. SCTA036A from Texas Instruments™ (December 1996) and the Xilinx™ application note entitled "Efficient Shift Registers, LFSR Counters, and Long Pseudo-Random Sequence Generators," by Peter Alfke, XAPP 052, 7 Jul. 1996 (Version 1.1), both of which are incorporated herein by reference.

Figure 7:
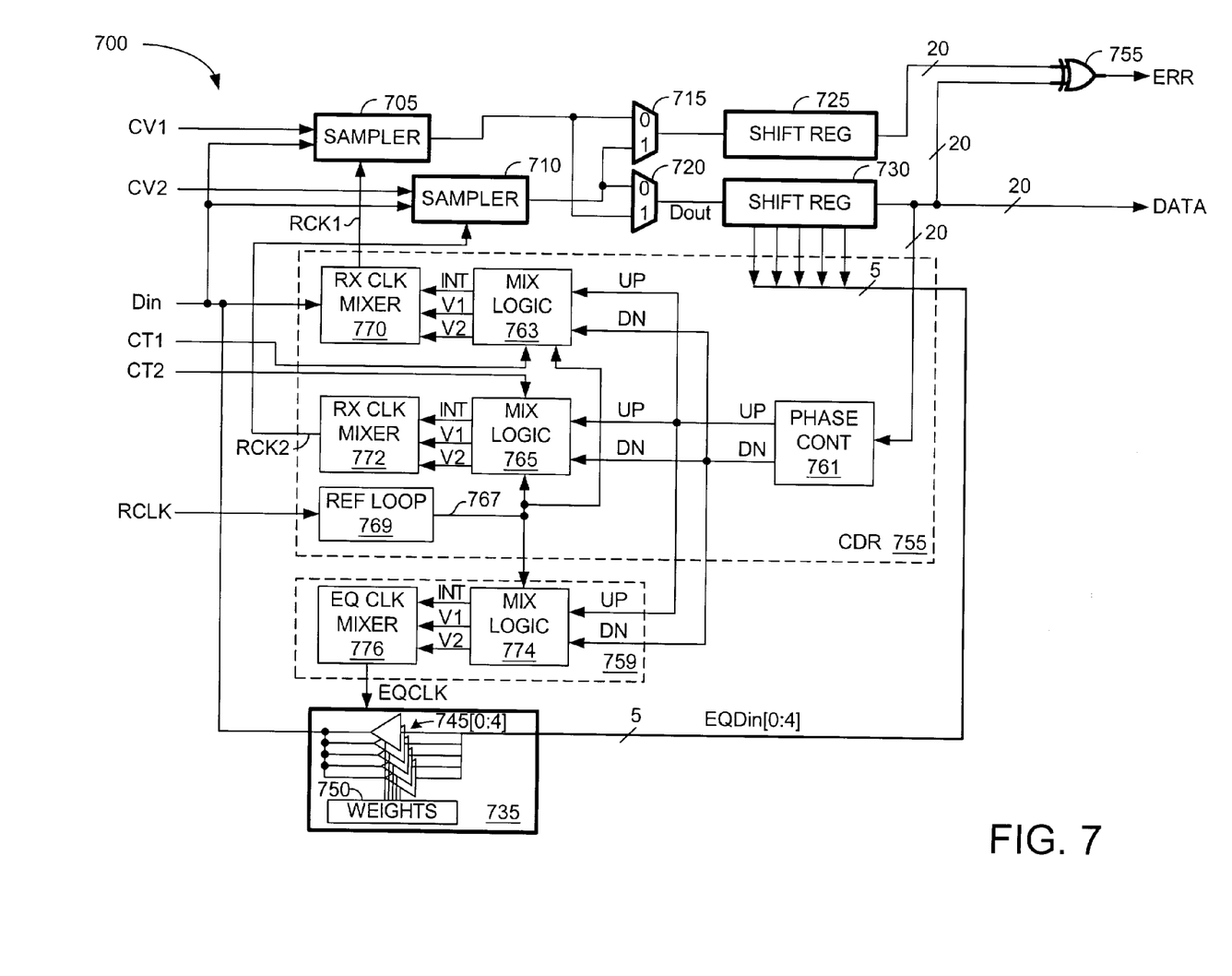
FIG. 7 depicts a receiver 700 in accordance with yet another embodiment.

FIG. 7 depicts a receiver 700 in accordance with yet another embodiment. FIG. 7 includes a number of elements that are incidental to the inventive margin-testing circuitry, and so are only touched upon briefly here. The main components of the margin-testing circuitry are highlighted using bold outlines to distinguish them from incidental features. The emphasized components include a pair of conventional samplers 705 and 710 receiving input data on the same input terminal, Din, a pair of multiplexers 715 and 720, a pair of shift registers 725 and 730, and a data-weighting circuit 735.

In the operational mode, multiplexers 715 and 720 both select their zero input. The input data Din captured by samplers 705 and 710 is thus conveyed to respective shift registers 725 and 730. The data in shift register 730 is the output data DATA of receiver 700, and is fed back to weighting circuit 735. For equalization feedback, all or a subset of the bits stored in the plurality of storage elements that make up shift register 730 are provided to weighting circuit 735. In one embodiment, shift registers 725 and 730 each store twenty bits. Of these, five bits from register 730 are conveyed to weighting circuit 735. The selected bits and their associated weighting are optimized for a given receiver. For a detailed discussion of methods and circuits for performing such optimization, see U.S. application Ser. No. 10/195,129 entitled "Selectable-Tap Equalizer," by Zerbe et al., filed Jul. 12, 2002, which is incorporated herein by reference. The details of that reference pertain to the optimization of a number of novel receivers. The margining methods and circuits disclosed herein may be of use in any systems that employ historical data to reduce ISI.

Weighting circuit 735 produces a weighted sum of a plurality of historical bits and applies this sum to input terminal Din. This is the same general function provided by the ladder circuit of FIG. 1, though the manner in which these weighting circuits performs this function differs significantly.

Weighting circuit 735 includes five amplifiers 745[0:4], each of which receives a bit from shift register 730. A weight-reference circuit 750 provides each amplifier 745 with a reference signal (e.g., a constant current) that determines the weight given to the associated bit. The output terminals of amplifiers 745[0:4] are connected to input terminal Din to provide a weighted sum of five historical data values from shift register 730. A current-controlled embodiment of an amplifier 745[i] is detailed below in connection with FIG. 8.

In the margin-test mode, each of multiplexers 715 and 720 selects its "one" input. The output of sampler 705 is thus conveyed to shift register 730 and the output of sampler 710 is conveyed to shift register 725. Recall that a function of the margin-test mode is to provide expected data to the input of the DFE circuitry. In this case, the expected data is the input data sampled by sampler 705 and captured in shift register 730. A voltage-control signal CV2 and timing control signal CT2 allow a tester or test personnel to alter the reference voltage and received clock RCK2 as necessary to probe the margin boundaries for sampler 710. Similar control signals CV1 and CT1 afford similar control over sampler 705 and are set to appropriate levels to ensure sampler 705 correctly captures the input data.

During a margin test, erroneous bits from sampler 710 are stored in shift register 725. Comparison circuit 755 will therefore produce a logic-one error signal on line ERR. In this embodiment, it is not necessary to store expected data in advance or to provide a dedicated source of expected data. Instead, the expected data is derived from input data on terminal Din. The sampler used to produce output data in the operational mode, sampler 710, is the same register subjected to the margin test. Testing the receive circuitry, as opposed to a replica, is advantageous because it provides a more accurate reading of the actual receive-circuitry performance. Also important, sampler 705 can be margined in a normal operating mode, assuming that it has independent timing and voltage control relative to sampler 710.

Receiver 700 of FIG. 7 is an equalizing receiver that generates receive and equalization clock signals. The following discussion outlines various features of receiver 700. For a more detailed discussion of similar receivers, see the above-incorporated application to Zerbe et al.

In addition to the components discussed above in relation to the margin-testing methods and circuits, receiver 700 includes a CDR circuit 755 and an equalizer clock generator 759. Samplers 705 and 710 sample incoming data signal Din in response to respective receive-clock signals RCK1 and RCK2, both the which are derived from a reference clock RCLK. The samples taken by sampler 710 are shifted into register 730, where they are stored for parallel output via output bus DATA to some application logic (not shown) and to CDR circuit 755.

Receive clock signal RCLK includes multiple component clock signals, including a data clock signal and its complement for capturing even and odd phase data samples, and an edge clock signal and a complement edge clock signal for capturing edge samples (i.e., transitions of the data signal between successive data eyes). The data and edge samples are shifted into shift registers 725 and 730. Samples in register 730 are then supplied as parallel words (i.e., a data word and an edge word) to a phase control circuit 761 within CDR circuit 755. Phase control circuit 761 compares adjacent data samples (i.e., successively received data samples) within a data word to determine when data signal transitions have taken place, then compares an intervening edge sample with the preceding data sample (or succeeding data sample) to determine whether the edge sample matches the preceding data sample or succeeding data sample. If the edge sample matches the data sample that precedes the data signal transition, then the edge clock is deemed to be early relative to the data signal transition. Conversely, if the edge sample matches the data sample that succeeds the data signal transition, then the edge clock is deemed to be late relative to the data signal transition. Depending on whether a majority of such early/late determinations indicate an early or late edge clock (i.e., there are multiple such determinations due to the fact that each edge word/data word pair includes a sequence of edge and data samples), phase control circuit 761 asserts an up signal (UP) or down signal (DN). If there is no early/late majority, neither the up signal nor the down signal is asserted.

Each of a pair of mix logic circuits 763 and 765 receives a set of phase vectors 767 (i.e., clock signals) from a reference loop circuit 769 and respective timing control signals CT1 and CT2 as noted above. The phase vectors have incrementally offset phase angles within a cycle of a reference clock signal. For example, in one embodiment the reference loop outputs a set of eight phase vectors that are offset from one another by 45 degrees (i.e., choosing an arbitrary one of the phase vectors to have a zero degree angle, the remaining seven phase vectors have phase angles of 45, 90, 135, 180, 225, 270 and 315 degrees). Mix logic circuits 763 and 765 maintain respective phase count values, each of which includes a vector select component to select a phase-adjacent pair of the phase vectors (i.e., phase vectors that bound a phase angle equal to 360°/N, where N is the total number of phase vectors), and an interpolation component (INT). The interpolation component INT and a pair of phase vectors V1 and V2 are conveyed from each of mix logic circuits 763 and 765 to respective receive-clock mixer circuits 770 and 772. Mixer circuits 770 and 772 mix their respective pairs of phase vectors according to the interpolation component INT to generate complementary edge clock signals and complementary data clock signals that collectively constitute first and second receive-clock signals RCK1 and RCK2, which serve as input clocks for samplers 705 and 710, respectively. Timing control signals CT1 and CT2 facilitate independent control of the timing of clock signals RCK1 and RCK2.

Mix logic circuit 765 increments and decrements the phase count value in response to assertion of the up and down signals, respectively, thereby shifting the interpolation of the selected pair of phase vectors (or, if a phase vector boundary is crossed, selecting a new pair of phase vectors) to retard or advance incrementally the phase of the receive clock signal. For example, when the phase control logic 761 determines that the edge clock leads the data transition and asserts the up signal, mix logic 765 increments the phase count, thereby incrementing the interpolation component INT of the count and causing mixer 772 to incrementally increase the phase offset (retard the phase) of receive-clock signal RCK1. At some point, the phase control signal output begins to dither between assertion of the up signal and the down signal, indicating that edge clock components of the receive clock signal have become phase aligned with the edges in the incoming data signal. Mix logic 763 and mixer 770 are analogous to mix logic 765 and 772, but control the receive clock RCK1 to sampler 705. These redundant circuits are provided so the receive-clock timing to samplers 705 and 710 can be independently adjusted during margin testing.

The equalizer clock generator 759 receives the phase vectors 767 from the reference loop 769 and includes mix logic 774 and an equalizer clock mixer 776, which collectively operate in the manner described above in connection with mix logic 765 and mixer 772. That is, mix logic 774 maintains a phase count value that is incrementally adjusted up or down in response to the up and down signals from the phase control circuit 761. The mix logic selects a phase-adjacent pair of phase vectors 767 based on a vector select component of the phase count. The mix logic then outputs the selected vectors (V1, V2) and interpolation component of the phase count (INT) to the equalizer clock mixer 776. Clock mixer 776 mixes the selected vectors in accordance with the interpolation component of the phase count to generate the equalizer clock signal EQCLK. The equalizer clock signal, which may include complementary component clock signals, is provided to weighting circuit 735 (or other type of equalization circuit) to time the output of equalizing signals onto data input terminal Din.

Figure 8:
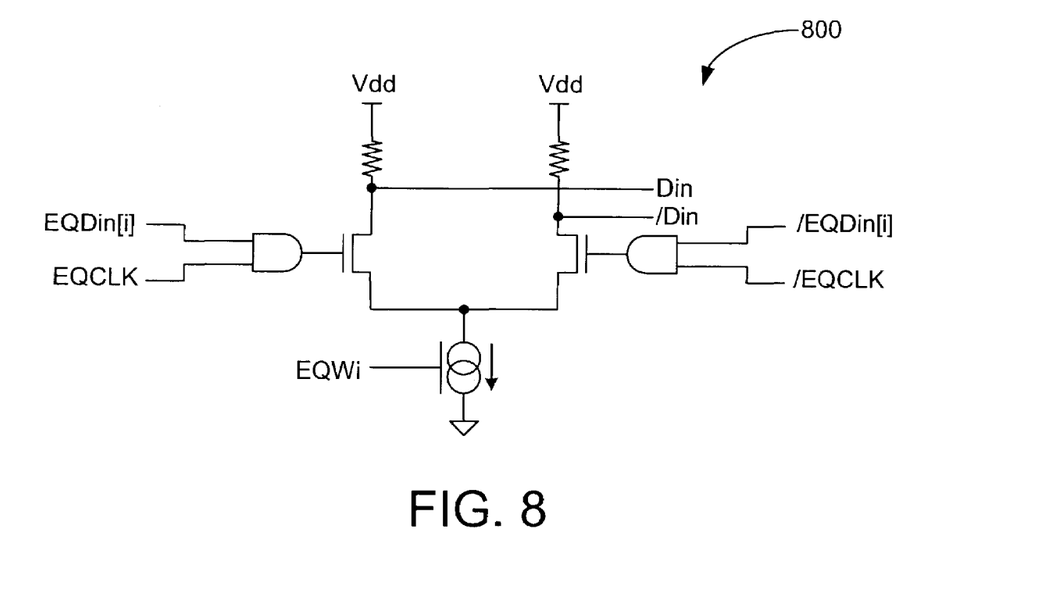
FIG. 8 depicts an embodiment of a buffer 800, which may be used as one of buffers 745 in weighting circuit 735 of FIG. 7.

FIG. 8 depicts an embodiment of a buffer 800 that may be used as one of buffers 745 in weighting circuit 735 of FIG. 7 in an embodiment in which the data input Din is a two-terminal port receiving differential input signals Din and /Din. Clock signal EQCLK is also a differential signal EQCLK and /EQCLK in this embodiment.

Buffer 800 receives one of five differential feedback signals (EQDin[i] and /EQDin[i]) and the differential clock signal (EQCLK and /EQCLK) from mixer 776. Reference circuit 750 provides a reference voltage EQWi that determines the current through buffer 745, and consequently the relative weight of the selected feedback data bit.

The above-described embodiments are adapted for use in receivers of various types. The embodiment of FIG. 6, for example, is applied to a receiver adapted to receive single-ended input signals, while the embodiments of FIGS. 7 and 8 are applied to receivers adapted to receive complementary signals. These examples are not limiting, as these and other embodiments can be applied to receivers adapted to communicate signals in any of a number of communication schemes, including pulse-amplitude modulated (PAM) signals (e.g., 2-PAM and 4-PAM), which may be used in some embodiments to provide increased data rates.

While the present invention has been described in connection with specific embodiments, variations of these embodiments will be obvious to those of ordinary skill in the art. Moreover, unless otherwise defined, terminals, lines, conductors, and traces that carry a given signal fall under the umbrella term "node." In general, the choice of a given description of a circuit node is a matter of style, and is not limiting. Likewise, the term "connected" is not limiting unless otherwise defined. Some components are shown directly connected to one another while others are shown connected via intermediate components. In each instance, the method of interconnection establishes some desired electrical communication between two or more circuit nodes, or terminals. Such communication may often be accomplished using a number of circuit configurations, as will be understood by those of skill in the art. Furthermore, only those claims specifically reciting "means for" or "step for" should be construed in the manner required under the sixth paragraph of 35 U.S.C. section 112. Therefore, the spirit and scope of the appended claims should not be limited to the foregoing description.

What is claimed is:

1. A receiver comprising:
   a. a first sampler having:
      i. a first plurality of sampler input terminals, including a first sampler data terminal to receive an input data stream and a first sampler reference terminal; and
      ii. a first sampler output terminal to produce a first sampled data stream from the input data stream;
   b. a second sampler having
      i. a second plurality of sampler input terminals, including a second sampler data terminal to receive the input data stream and a second sampler reference terminal; and
      ii. a second sampler output terminal to produce a second sampled data stream from the input data stream;
   c. a feedback circuit having:
      i. a plurality of delay elements selectively coupled to the first and second sampler output terminals to alternatively receive one of the first and second sampled data streams, each delay element to provide at least one historical bit from the selected one of the first and second sampled data streams; and
      ii. a plurality of data-weighting circuits, each data-weighting circuit coupled between one of the plurality of delay elements and at least one of the first and second sampler input terminals to provide a weighted feedback to the at least one of the first and second sampler input terminals based on the at least one historical bit from the corresponding delay element; and
   d. a comparison circuit to compare the first sampled data stream with the second sampled data stream; wherein the comparison circuit produces an error signal responsive to a mismatch between the first and second sampled data streams.

2. The receiver of claim 1, wherein the delay elements form a register.

3. The receiver of claim 2, wherein the register is a shift register.

4. The receiver of claim 1 further comprising a multiplexer coupled between the first and second sampler output terminals and the plurality of delay elements.

5. A receiver comprising:
   a. a first sampler having:
      i. a first sampler input terminal receiving a series of data symbols; and
      ii. a first sampler output terminal producing a first sampled data stream;
   b. a second sampler having:
      i. a second sampler input terminal receiving the series of data symbols; and
      ii. a second sampler output terminal producing a second sampled data stream;
   c. a feedback circuit including:
      i. a feedback-circuit input terminal selectively coupled to the first and second sampler output terminals to alternatively receive one of the first and second sampled data streams; and
      ii. a feedback-circuit output terminal coupled to the first and second sampler input terminals; and
   d. a comparison circuit to compare the first sampled data stream with the second sampled data stream; wherein the comparison circuit produces an error signal responsive to a mismatch between the first and second sampled data streams.

6. The receiver of claim 5, wherein the first sampler input terminal includes first and second complementary sampler input terminals.

7. The receiver of claim 5, the feedback circuit further including a shift register, the shift register including a plurality of storage elements and a shift-register input terminal coupled to the first sampler output terminal, the storage elements storing a bits from the first sampled data stream.

8. The receiver of claim 7, the feedback circuit further including a plurality of data-weighting circuits, each data-weighting circuit connected between one of the plurality of storage elements and the first sampler input terminal and the second sampler input terminal.

9. The receiver of claim 5, wherein a multiplexer performs the selective coupling.

10. The receiver of claim 9, further comprising a second multiplexer coupled to the first and second sampler output terminals.

11. The receiver of claim 5, wherein the series of data symbols are expressed as a differential signal.

12. A method comprising:
   a. sampling a first series of input symbols using first and second data samplers to produce a first sampled-data series and a second sampled-data series, respectively;
   b. developing first feedback signals from the first sampled-data series and applying the first feedback signals to the first and second data samplers while comparing the first sampled data series with the second sampled data series;
   c. sampling a second series of input symbols using the first and second data samplers to produce a third sampled-data series and a fourth sampled-data series, respectively; and
   d. developing second feedback signals from the fourth sampled-data series and applying the second feedback signals to the second data sampler.

13. The method of claim 12, further comprising applying the second feedback signals to the first data sampler.

14. The method of claim 12, further comprising adjusting at least one of a reference voltage or a reference clock of the second sampler based on the comparing of the first and second sampled data series.

15. A receiver having a feedback equalization path, the receiver comprising:
   a. a first sampler having:
      i. first sampler input terminal adapted to receive a series of data symbols; and
      ii. a first sampler output terminal adapted to produce a first sampled data stream;
   b. a second sampler having:
      i. second sampler input terminal adapted to receive the series of data symbols; and
      ii. a second sampler output terminal adapted to provide expected data; and
   c. a feedback circuit including a feedback-circuit input terminal coupled between the first sampler output terminal and the first and second sampler input terminals;
   d. a first multiplexer having a first pair of multiplexer input terminals coupled to the first and second sampler output terminals, wherein the first multiplexer is coupled between the first and second sampler output terminals and the feedback-circuit input terminal; and e. a second multiplexer having a second pair of multiplexer input terminals coupled to the first and second sampler output terminals.

16. The receiver of claim 15, wherein the series of data symbols comprises complementary first and second signals, wherein the first and second sampler input terminals receive the first signal, and wherein the first and second samplers are adapted to receive the second signal.

17. The receiver of claim 15, the feedback circuit further including a shift register, the shift register including a plurality of storage elements and a shift-register input terminal coupled to the first multiplexer.

18. The receiver of claim 17, the feedback circuit further including a plurality of data-weighting circuits, each data-weighting circuit connected between one of the plurality of storage elements and the first and second sampler input terminals.

19. The receiver of claim 15, further comprising a comparison circuit coupled to output terminals of the first and second multiplexers.

20. The receiver of claim 19, further comprising a first shift register coupled between the first multiplexer and the comparison circuit and a second shift register coupled between the second multiplexer and the comparison circuit.

21. The receiver of claim 15, wherein the series of data symbols are expressed as a differential signal.

22. A receiver having a feedback path, the receiver comprising:

a. first means for sampling a series of input symbols to produce a first sampled-data series;

b. second means for sampling the series of input symbols to produce a second sampled data series;

c. means for alternatively applying the first sampled-data series or the second sampled-data series to the feedback path; and d. a means for comparing the first sampled data series with the second sampled data series while applying the second sampled data series to the feedback path, and for comparing the first sampled data series with the second sampled data series while applying the first sampled data series to the feedback path.

* * * * *